US010369502B2

(12) United States Patent
Harrelson et al.

(10) Patent No.: US 10,369,502 B2
(45) Date of Patent: Aug. 6, 2019

(54) SPIN-ON FILTER USING SNAP-FIT (71) Applicant: MANN+HUMMEL Filtration Technology Group Inc., Gastonia, NC (US)

(72) Inventors: David Brent Harrelson, Mt. Holly, NC (US); James Michael Glazewski, Gastonia, NC (US); Matthew Robert Hudson, Belmont, NC (US)

(73) Assignee: MANN+HUMMEL Filtration Technology Group Inc., Gastonia, NC (US)

( * ) Notice: Subject to any disclaimer, the term of this patent is extended or adjusted under 35 U.S.C. 154(b) by 104 days.

(21) Appl. No.: 15/403,044

(22) Filed: Jan. 10, 2017

(65) Prior Publication Data
US 2018/0193780 A1 Jul. 12, 2018

(51) Int. Cl.
*B01D 35/30* (2006.01)
*F01M 11/03* (2006.01)
*F02M 37/22* (2019.01)
*B01D 29/11* (2006.01)
*B01D 27/06* (2006.01)
(Continued)

(52) U.S. Cl.
CPC ............ *B01D 35/30* (2013.01); *B01D 27/06* (2013.01); *B01D 27/08* (2013.01); *B01D 29/21* (2013.01); *F01M 11/03* (2013.01); *F02M 37/22* (2013.01); *B01D 2201/316* (2013.01); *B01D 2201/4084* (2013.01)

(58) Field of Classification Search
CPC .... B01D 35/30; B01D 29/114; B01D 35/005; B01D 2201/316; B01D 2201/4092; F02M 37/22; F01M 11/03

USPC .................. 210/DIG. 17, 440, 443, 455, 444
See application file for complete search history.

(56) References Cited

U.S. PATENT DOCUMENTS 5,698,097 A 12/1997 Gebert et al.
6,523,561 B2 2/2003 Kapcoe et al.
(Continued)

FOREIGN PATENT DOCUMENTS

EP 1113853 B1 12/2005
WO WO-8603687 A1 7/1986
WO 2015135767 A1 9/2015

OTHER PUBLICATIONS

International search report and written opinion for application No. PCT/US2018012862 dated Apr. 17, 2018.

*Primary Examiner* — Madeline Gonzalez
(74) *Attorney, Agent, or Firm* — Honigman LLP (57) ABSTRACT A spin-on filter includes a housing and a cover plate defining a central opening. The housing has a closed end a circumferential wall extending from the closed end to an open end and circumscribes an internal chamber configured to receive a filter element. The cover plate includes a substantially planar outer surface extending radially outward from the central opening to an outer circumferential wall. The spin-on filter also includes a series of engagement tabs integrally formed with one of the outer circumferential wall of the cover plate or the interior wall of the housing. Each engagement tab is configured to mate with corresponding ones of a series of receiving slots formed within the other one of the outer circumferential wall of the cover plate or the interior wall of the housing when the cover plate and the housing are axially pressed together to secure the cover plate to the open end of the housing.

19 Claims, 8 Drawing Sheets (51) Int. Cl.
*B01D 27/08* (2006.01)
*B01D 29/21* (2006.01)
B01D 35/00 (2006.01)

(56) References Cited

U.S. PATENT DOCUMENTS

| | | |
|---|---|---|
| 7,387,726 B2 | 6/2008 | Wolf et al. |
| 7,771,596 B2 | 8/2010 | Mckenzie et al. |
| 8,083,074 B2 | 12/2011 | South et al. |
| 8,231,783 B1 | 7/2012 | Guddee |
| 8,920,641 B2 | 12/2014 | Oh et al. |
| 9,108,131 B2 | 8/2015 | Thalmann et al. |
| 2003/0089654 A1 | 5/2003 | Jainek |
| 2007/0095744 A1* | 5/2007 | Bagci ............... B01D 29/21 210/435 |
| 2009/0078626 A1 | 3/2009 | Krull et al. |
| 2014/0284265 A1* | 9/2014 | Sann ............... B01D 29/21 210/450 |

* cited by examiner

SPIN-ON FILTER USING SNAP-FIT

TECHNICAL FIELD

This disclosure relates to fuel filter assemblies, and more particularly to a spin-on filter having cover plate and housing secured together using a snap-fit connection.

BACKGROUND

Spin-on filters may be used in fuel systems and lubrication systems to remove particulates within a fuel stream or a lubrication stream between a fuel tank or a lubrication reservoir and an engine and/or other components. Spin-on filters typically mount to a mounting adapter of a fluid circuit and receive and return fluid therefrom. In some configurations, spin-on filters include a steel canister housing a filter element, and having a closed end and an open end. At the open end, a connection must be provided to connect the spin-on filter to the mounting adapter in a spin-on fashion. It is generally known to use a threaded baseplate (e.g., cover plate) to provide this connection.

It is known, to use materials such as plastic to form the spin-on filters to reduce cost and weight. However, the joining between a plastic canister and a plastic cover plate generally requires the use of adhesives and/or vibrational or spin welding. Both spin and vibrational techniques of welding plastic use heat to join the two components which can result in material voids that result in by-passes. Moreover, spin and vibrational techniques require an additional off-line process which increases the total assembly time.

SUMMARY

One aspect of the disclosure provides a spin-on filter including a housing and a cover plate defining a central opening. The housing may include a closed end and a circumferential wall extending from the closed end to an open end and circumscribing an internal chamber configured to receive a filter element. The cover plate may include a substantially planar outer surface extending radially outward from the central opening to an outer circumferential wall. The spin-on filter may also include a series of engagement tabs integrally formed with one of the outer circumferential wall of the cover plate or the interior wall of the housing. Each engagement tab may be configured to mate with corresponding ones of a series of receiving slots formed within the other one of the outer circumferential wall of the cover plate or the interior wall of the housing when the cover plate and the housing are axially pressed together to secure the cover plate to the open end of the housing.

In some implementations, the interior wall at the open end of the housing includes a greater diameter than an outer circumferential edge of the outer circumferential wall such that the interior wall at the open end of the housing encloses at least a portion of the outer circumferential wall of the cover plate when the cover plate is secured to the open end of the housing. Each engagement tab may mate with the corresponding receiving slot at a corresponding mating location within the internal chamber of the housing. The mating location may be obstructed from view by the outer surface of the cover plate and an exterior wall of the housing. Here, the exterior wall may be disposed on an opposite side of the housing than the interior wall.

In some configurations, each engagement tab may include an axial portion axially extending from a proximal end to a distal end and an interference portion protruding radially away from the distal end of the axial portion. The axial portion may be disposed radially inward from an outer peripheral edge of the outer circumferential wall of the cover plate. The interference portion may be configured to mate with the corresponding receiving slot to prevent the cover plate and the housing from moving relative to one another when the cover plate and the housing are axially pressed together. Each receiving slot may be associated with a corresponding axial groove having a smaller radial depth than the receiving slot. The axial groove may be configured to axially guide the interference portion of the corresponding engagement tab into mating engagement with the receiving slot when the cover plate and the housing are axially pressed together. Additionally or alternatively, the axial portion of each engagement tab may be configured to flex radially away from the corresponding receiving slot while the interference portion axially guides along the corresponding axial groove.

In the configuration set forth above, the proximal end of the axial portion may be integrally formed with the outer circumferential wall of the cover plate, the distal end of the axial portion may be disposed further from the outer surface of the cover plate than the proximal end, and the interference portion may protrude radially outward from the distal end and toward the receiving slot formed within the interior wall of the housing. In the alternative, the proximal end of the axial portion may integrally formed with the interior wall of the cover plate, the distal end of the axial portion may be disposed closer to the outer surface of the cover plate than the proximal end, and the interference portion may protrude radially outward from the distal end toward the corresponding receiving slot formed within an inner peripheral edge of the outer circumferential wall of the cover plate.

In some implementations, the interior wall of the housing includes a wide section proximate to the open end of the housing and a narrow section axially extending between the wide section and the closed end of the housing. The wide section may enclose at least a portion of the outer peripheral wall of the cover plate when the cover plate is secured to the open end of the housing. The narrow section may include a smaller diameter than the wide section and may be axially spaced apart from the open end of the housing by an axial distance of the wide section. The series of receiving slots may be formed in the narrow section of the interior wall and each receiving slot may be associated with a corresponding axial groove formed in the narrow section of the interior wall and axially extending from the wide section to the corresponding receiving slot. Each axial groove may be disposed radially inward from the wide section of the interior wall.

Another aspect of the disclosure provides a spin-on filter including a housing and a cover plate including an outer circumferential wall surrounding a central opening. The housing may include a closed end and a circumferential interior wall axially extending from the closed end to an open end and circumscribing an internal chamber configured to receive a filter element. The cover plate may include a series of engagement tabs configured to axially extend into the internal chamber of the housing and mate with corresponding ones of a series of receiving slots formed within the interior wall of the housing when the cover plate and the housing are axially pressed together to secure the cover plate to the open end of the housing.

In some implementations, each engagement tab includes an axial portion and an interference portion. The axial portion axially may extend from a proximal end integrally formed with the outer peripheral wall or an inner surface of the cover plate to a proximal end. Here, the inner surface of the cover plate may radially extend between the central opening and an inner peripheral edge of the outer peripheral wall. The interference portion may extend radially outward from the distal end of the axial portion. The interior wall of the housing may include a wide section proximate to the open end of the housing and a narrow section axially extending between the wide section and the closed end of the housing. The open end may enclose at least a portion of the outer peripheral wall of the cover plate when the cover plate is secured to the open end of the housing, and the narrow section may include a smaller diameter than the wide section and may be axially spaced apart from the open end of the housing by an axial distance of the wide section. Here, the series of receiving slots may be formed within the narrow section of the interior wall. Each receiving slot may be configured to receive the interference portion of the corresponding engagement tab to prevent the cover plate and the housing from moving relative to one another when the cover plate and the housing are axially pressed together.

In some examples, each receiving slot is associated with a corresponding axial groove formed in the narrow section of the interior wall. In these examples, the axial groove may axially extend from the wide section to the corresponding receiving slot and may be disposed radially inward from the wide section of the interior wall to define an axial length substantially equal to an axial length of the axial portion of the corresponding engagement tab.

The inner peripheral edge of the outer peripheral wall may define a diameter substantially equal to a diameter of the narrow section of the interior wall. In some examples, the central opening includes internal threads adapted to threadingly engage with corresponding threads of a standpipe assembly.

In some configurations the cover plate includes a substantially planar outer surface radially extending between the central opening and an outer peripheral edge of the outer peripheral wall, a substantially planar inner surface disposed on an opposite side of the cover plate than the outer surface and opposing the internal chamber when the cover plate is secured to the housing, and one or more inlet fuel ports formed through the inner and outer surfaces. The inner surface may radially extend between the central opening and an inner peripheral edge of the outer peripheral wall. In these configurations, the cover plate may include an axial collar circumscribing the central opening and extending axially away from at least the inner surface. In other configurations, the inner peripheral edge of the outer peripheral wall circumscribes the central opening.

Yet another aspect of the disclosure provides a method of manufacturing a spin-on filter. The method may include inserting a filter element into an internal chamber of a housing. The housing may include a closed end and a circumferential interior wall axially extending from the closed end to an open end and circumscribing the internal chamber. The method may also include positioning a cover plate in alignment with the open end of the housing. The cover plate may include a series of engagement tabs configured to extend into the internal chamber of the housing when the cover plate is aligned with the open end of the housing. The method may also include axially pressing the cover plate and the housing together to cause each engagement tab to mate with a corresponding one of a series of receiving slots formed within the interior wall of the housing. The mating between the engagement tabs and the receiving slots may secure the cover plate to the open end of the housing. A radial seal may be disposed between an outer circumferential edge of the cover plate and the interior wall of the housing to provide a fluid tight seal between the outer circumferential edge of the cover plate and the interior wall of the housing when the cover plate secures to the open end of the housing.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
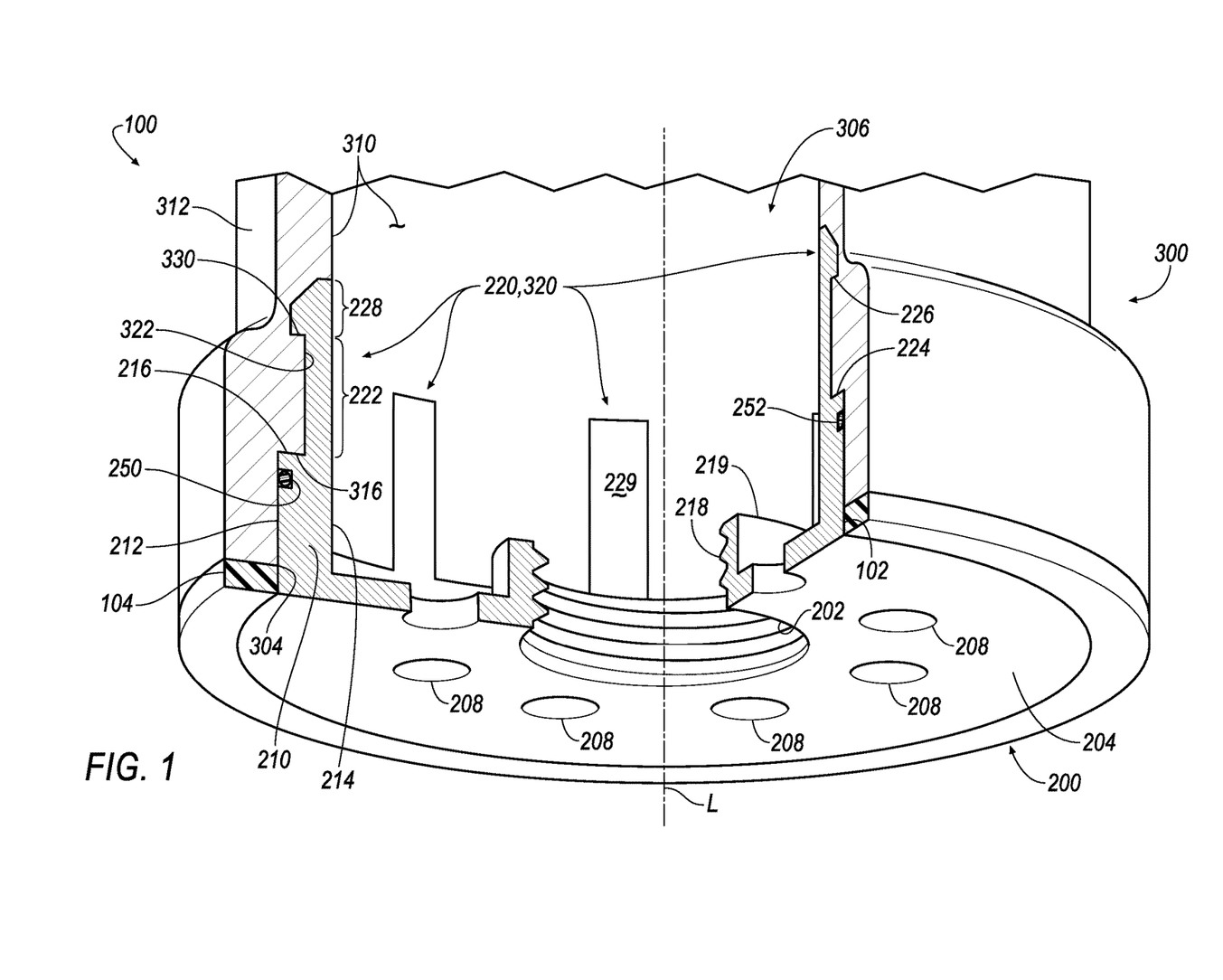
FIG. 1 is a partial perspective cutaway view of a spin-on filter including a cover plate secured to an open end of a housing using a snap-fit connection.

Referring to FIG. 1, in some implementations, a spin-on filter 100 includes a cover plate 200 secured to a filter housing 300 using a snap-fit connection. The housing 300 includes a closed end 302 (FIG. 3) and a circumferential interior wall 310 axially extending from the closed end 302 to an open end 304 and circumscribing an internal chamber 306 configured to receive a filter element 10 (FIG. 4). The filter element 10 is removed from FIG. 1 for clarity. The housing 300 defines a central longitudinal axis L extending from the closed end 302 to the open end 304. The cover plate 200 defines a central opening 202 coaxial with the longitudinal axis L and includes an outer peripheral wall 210 surrounding the central opening 202.

In some examples, the cover plate 200 also includes a substantially planar outer surface 204 extending radially between the central opening 202 to an outer peripheral surface 212 of the outer peripheral wall 210 and a substantially planar inner surface 206 (FIG. 2) disposed on an opposite side of the plate 200 than the outer surface 204 and opposing the internal chamber 306 when the plate 200 is secured to the open end 304 of the housing 300. Here, the inner surface 206 radially extends between the central opening 202 and an inner peripheral surface 214 of the outer peripheral wall 210. In some examples, the cover plate 200 includes one or more inlet ports 208 formed through the inner and outer surfaces 204, 206 and configured to direct an inlet flow of fluid (e.g., fuel, oil, or other liquid) into the internal chamber 306 to filter out contaminants. The outer peripheral wall 210 may include a ledge 216 radially extending between the outer peripheral surface 212 and the inner peripheral surface 214 and configured to rest in opposed contact with the a seating surface 316 defined by the interior wall 310 of the housing when the cover plate 200 secures to the open end 304 of the housing 300. In some implementations, the central opening 202 includes internal threads 218 adapted to threadingly engage with corresponding threads of a standpipe assembly 450 (FIG. 4) to mount the spin-on filter 100 to the standpipe assembly 450.

In some configurations, mating between a series of engagement tabs 220 of the plate 200 and corresponding ones of a series of receiving slots 320 formed within the interior wall 310 of the housing 300 provides the snap-fit connection to secure the cover plate 200 to the housing 300. The mating between each tab-receiving slot pair 220, 320 may occur when the cover plate 200 and the housing 300 are axially pressed together to prevent the plate 200 from moving relative to the housing 300 after mating occurs. In some implementations, once the tabs 220 mate or engage with the corresponding receiving slots 320, the cover plate 200 is permanently secured/fixed to the housing 300 such that the engagement tabs 220 cannot be disengaged from the corresponding receiving slots 320. Moreover, the mating between each tab-receiving slot pair 220, 320 may occur at a point when the ledge 216 of the outer circumferential wall 210 of the cover plate 200 contacts the seating surface 316 provided by the interior wall 310 of the housing 300.

FIG. 1 shows each engagement tab 220 axially extending into the internal chamber 306 of the housing 300 and mating with the corresponding receiving slot 320 at a corresponding mating location within the internal chamber 306 of the housing 300. Thus, the mating location is obstructed from view by the outer surface 204 of the cover plate 200 and an exterior wall 312 of the housing 300 disposed on an opposite side of the housing than the interior wall 310. Therefore, once the cover plate 200 is secured to the housing 300, the engagement tabs 220 cannot be accessed from outside the filter 100 to prevent an end user from disassembling the filter 100. That is to say, the plate 200 and the housing 300 may be axially pressed together during assembly and cannot be separated without destructive means. As used herein, axially pressing the plate 200 and housing 300 together may refer to applying an axial force upon one or both of the plate 200 and housing 300 that results in an axial compressive force between the plate 200 and the housing 300 such that the ledge 216 of the plate 200 is pushed into contact with the seating surface 316 of the housing 300 and the engagement tabs 220 "snap" into engagement with the receiving slots 320. In some scenarios, the plate 200 and the housing 300 are axially pressed together in-line with a simple actuation device, such as a linear piston, without requiring an additional off-line production process, such as spin or vibrational welding, to join the components. Upon assembling the housing 300 with the cover plate 200, as described herein, the housing 300 and the cover plate 200 may collectively define an annular groove 102. In this regard, the annular groove 102 may be defined by the open end 304 of the housing 300 and by the outer peripheral surface 212 of the cover plate 200. In some implementations, an annular seal 104 may be disposed within the annular groove 102.

In some implementations, each engagement tab 220 includes an axial portion 222 and an interference portion 228. In these implementations, the axial portion 222 axially extends from a proximal end 224 to a distal end 226 and is disposed radially inward from the outer peripheral surface 212 of the outer circumferential wall 210 of the cover plate 220. The example of FIG. 1 shows the proximal end 224 integrally formed with the outer peripheral wall 210 and extending axially away from the ledge 216 of the wall 210. In other examples, however, the proximal end 224 may be integrally formed with the inner surface 206 of the cover plate 220 and extend axially therefrom. The interference portion 228 protrudes radially away (e.g., radially outward relative to the view of FIG. 1) from the distal end 226 of the axial portion 222 and is configured to provide the mating with the corresponding receiving slot 320 to prevent the cover plate 200 and the housing 300 from moving relative to one another when the plate 200 and housing 300 are axially pressed together. The axial portion 222 may include a radially inner surface 229. In some implementations, the radially inner surface 229 defines a substantially planar construct, while the inner peripheral surface 214 defines an arcuate construct. For example, the inner peripheral surface 214 may define a substantially cylindrical construct. The receiving slots 320 may define a cavity having a geometry that corresponds with the geometry of the interference portions 228 of the engagement tabs 220.

Each receiving slot 320 may be associated with a corresponding axial groove 322 having a smaller radial depth into the interior wall 310 than the receiving slot 320. The axial groove 322 is configured to axially guide the interference portion 228 of the corresponding engagement tab 220 into mating engagement with the associated receiving slot 320 when the cover plate 200 and the housing 300 are axially pressed together. In some examples, the axial grooves 322 define an axial length substantially equal to an axial length of the axial portions 222 of the engagement tabs 220. Additionally or alternatively, the axial grooves 322 may define a radial depth substantially equal to a radial thickness of the axial portions 222.

In some implementations, the outer peripheral surface 212 of the outer peripheral wall 210 or the interior wall 310 defines a circumferential groove 250 configured to receive a radial seal 252 operative to provide a fluid tight seal between the cover plate 200 and the housing 300 when the cover plate 200 secures to the housing 300.

Figure 2:
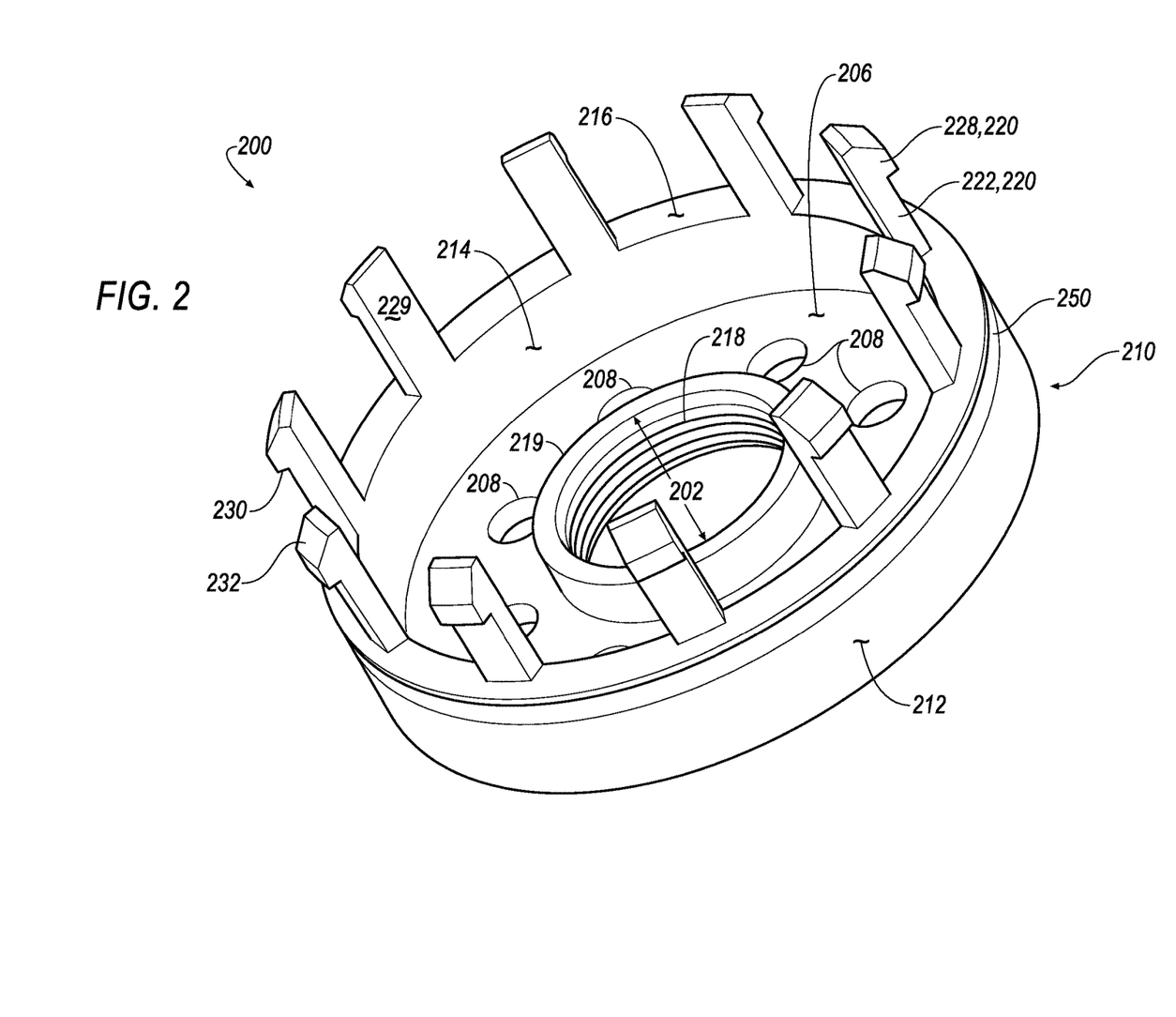
FIG. 2 is a top perspective view of the cover plate of FIG. 1 showing a series of engagement tabs that protrude axially away from the cover plate.

FIG. 2 provides a top perspective view of the cover plate 200 of FIG. 1 showing the series of engagement tabs 220 axially protruding away from the inner surface 206 of the cover plate 200. The example shows each engagement tab 220 integrally-formed with the outer peripheral wall 210 of the cover plate 200 and protruding axially away from the inner surface 206. Here, the engagement tabs 220 are circumferentially arranged upon the ledge 216 of the outer peripheral wall 210 and around the inner peripheral surface 214 of the inner peripheral wall 210 of the cover plate 200. For instance, in some implementations, the engagement tabs 220 may be substantially flush with the inner peripheral surface 214 such that no portion of the engagement tab 220 extends radially inward relative to the inner peripheral surface 214. Alternatively, one or more of the engagement tabs 220 may be integrally-formed with the inner surface 206 of the cover plate 200 and protrude axially therefrom. The engagement tabs 220 may flex relative to the outer circumferential wall 210 when radial forces are applied to the tabs 220. In some configurations, an axial collar 219 circumscribes the central opening 202 and extends axially away from at least the inner surface 206. The interference portion 228 of each engagement tab 220 may include a barb 230 for preventing the tab 220 and plate 200 from moving axially away from the housing 300 after the interference portion 228 snaps or locks into the corresponding receiving slot 320. Additionally or alternatively, the interference portion 228 of each tab 220 may include a cambered leading edge 232 that opposes the interior wall 310 of the housing 300 and prevents the engagement tabs 220 from catching on the interior wall 310 of the housing when the plate 200 and housing 300 are axially pressed together during assembly.

In some implementations, the engagement tabs 220 are integrally formed with the cover plate 200 during a forming process. In some examples, the tabs 220 and plate 200 are formed from plastic during an injection molding process. The plate 200 and/or tabs 220 may be formed from any other suitable materials such as metals and/or ceramics. FIG. 2 shows the circumferential groove 250 formed within the outer peripheral surface 212 of the outer peripheral wall 210.

Figure 3:
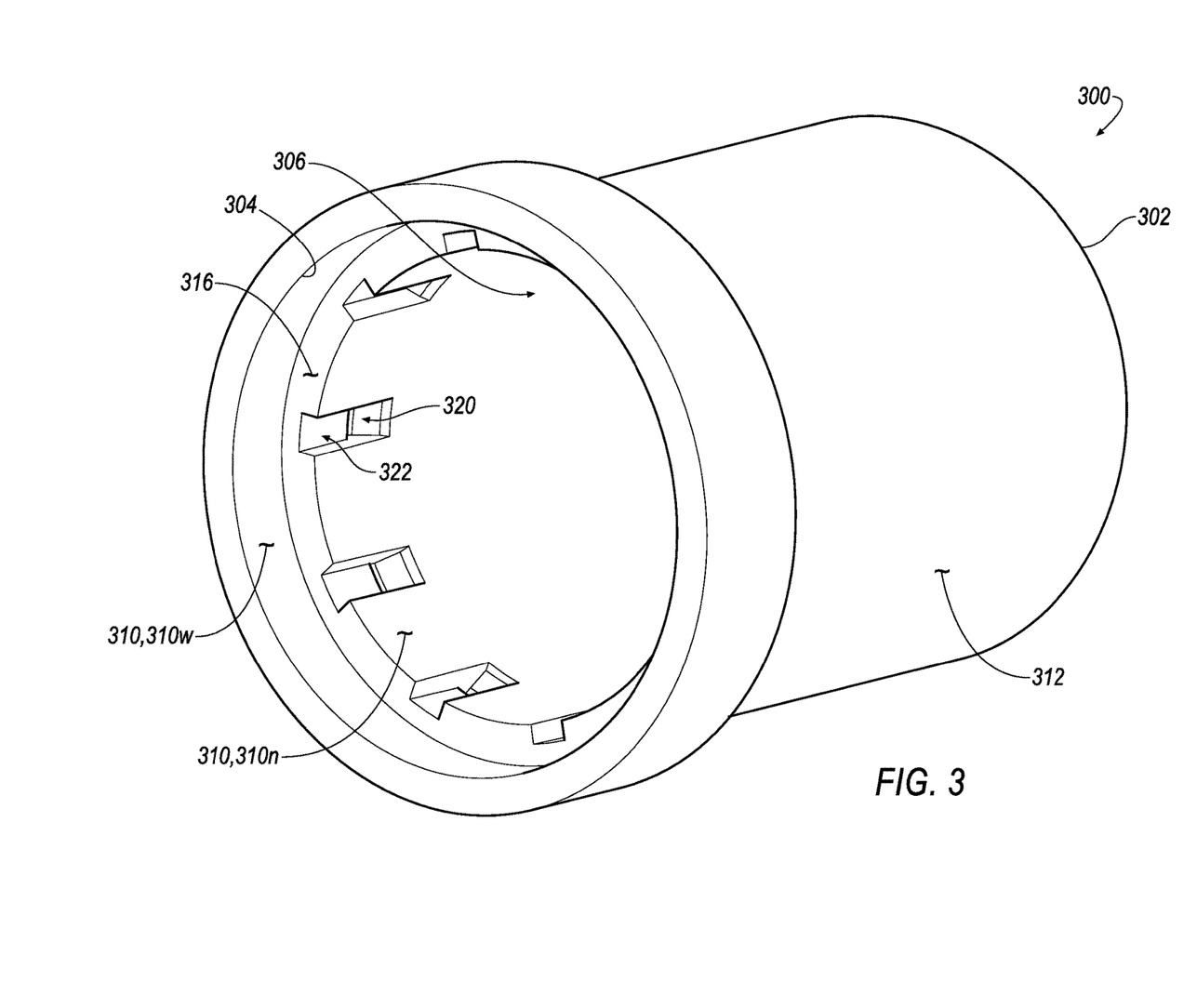
FIG. 3 is a bottom perspective view of the canister of FIG. 1 showing an interior wall of the canister having a series of receiving slots formed therein.
Figure 4:
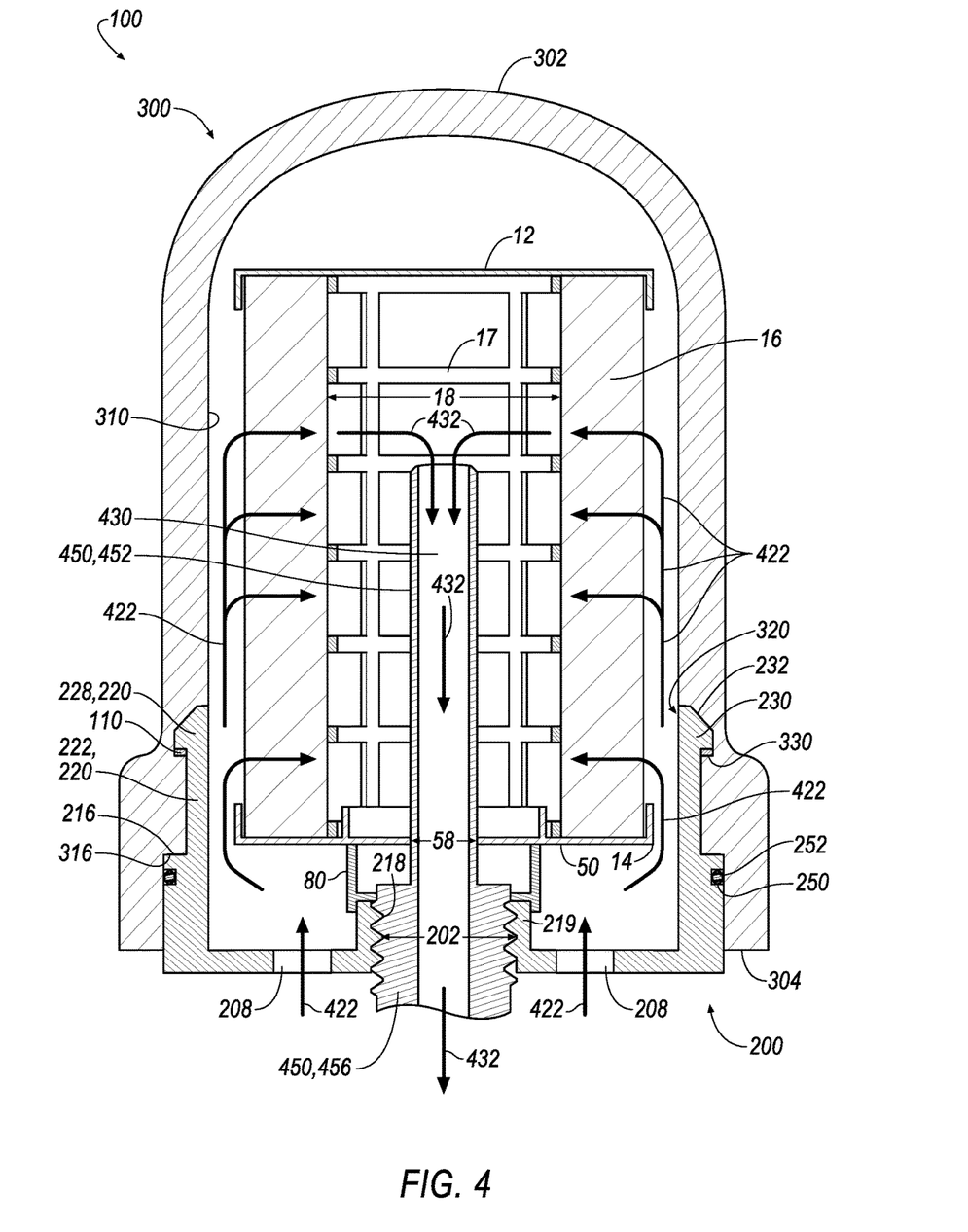
FIG. 4 is cross-sectional view of a spin-on filter including a filter housing, a filter element disposed within the filter housing, and a cover plate secured to an open end of the filter housing.

FIG. 3 provides a bottom perspective view of the housing 300 showing the interior wall 310 through the open end 304 of the housing 300. The interior wall 310 may include a wide section 310w proximate to the open end 304 of the housing 300 and configured to enclose at least a portion of the outer peripheral wall 210 of the cover plate 200 when the cover plate 200 secures to the open end 304 of the housing 300. That is to say, the wide section 310w of the interior wall 310 includes a diameter greater than a diameter of the outer circumferential surface 212 of the outer peripheral wall 210. The interior wall 310 may also include a narrow section 310n axially extending between the wide section 310w and the closed end 302 of the housing 300. Here, the narrow section 310n includes a smaller diameter than the wide section 310w and is axially spaced apart from the open end 304 of the housing 300 by an axial distance of the wide section 310w. The narrow section 310n may define a diameter substantially equal to a diameter of the inner peripheral surface 214 of the outer peripheral wall 210. In some implementations, the receiving slots 320 and the corresponding axial grooves 322 are formed within the narrow section 310n of the interior wall 310. For example, each axial groove 322 may axially extend from the wide section 310w of the interior wall 310 to the corresponding receiving slot 320. Moreover, each axial groove 322 may be disposed radially inward from the wide section 310w of the interior wall 310 such that the radial depth of the axial groove 322 is less than a radial distance between the narrow section 310n and the wide section 310w. As used herein, the radial distance between the sections 310n, 310w may be calculated by subtracting the diameter of the wide section 310w from the diameter of the narrow section 310n.

In some examples, a circumferential groove is formed within the wide section 310w of the interior wall 310 instead of the circumferential groove 250 of FIGS. 1 and 2 formed in the outer peripheral surface 212 of the cover plate 200. Here, the radial seal 252 may be seated within the groove 250 to provide the fluid tight seal when compressed between the wide section 310w and the outer peripheral surface 212 when the cover plate 200 and the housing 300 are axially pressed together. In some examples, the housing 300 is formed from plastic during an injection molding process. The housing 300 may be formed from any other suitable materials such as metals and/or ceramics.

Referring to FIG. 4, a cross-sectional view shows the spin-on filter 100 including the cover 200 secured to the housing 300 and the filter element 10 disposed within the internal chamber 306 of the housing 300. The filter element 10 and the housing 100 may cooperate to remove particulates from a stream of fluid, such as a stream of fuel in a fuel system or a stream of lubricant in a lubrication system, for example. For example, the spin-on filter 100 may be located downstream, on a pressure side of a fuel supply (e.g., a pump and/or fuel tank) for moving fuel through the system, e.g., from the fuel tank to an engine. The one or more inlet fuel ports 208 formed through the cover plate 200 may direct unfiltered fuel 422 from the fuel supply into the internal chamber 306 of the housing 300 to be filtered.

In some implementations, the filter element 10 includes a first end cap 12, a second end cap 14 opposing the first end cap 12, and a ring of filter media 16 disposed between the first end cap 12 and the second end cap 14 and circumscribing a central cavity 18. In the view of FIG. 3, the first end cap 12 is associated with a top end cap opposing the closed end 302 of the housing and affixing to a top end of the filter media 16 and the bottom end cap 14 is associated with a bottom end cap opposing the inner surface 206 of the cover plate 200 and affixing to a bottom end of the filter media 16 disposed on an opposite side of the filter media 16 than the top end. The filter media 16 may be formed form one or more materials having an efficiency and structure suitable for the particular application. The end caps 12, 14 may affix and sealingly bond to the respective ends of the filter media 16 using potting compounds, such as Plastisol, urethanes, or other suitable adhesives.

The second end cap 14 may define a centrally located standpipe opening 58 coaxial with the longitudinal axis L of the filter 100 and the central opening 202 of the cover plate 200. In some examples, an annular seal 80 is disposed between a bottom surface 50 of the second end cap 14 and the inner surface 206 of the cover plate 200. The seal 80 may be in opposed contact the periphery of the axial collar 219 of the cover plate 200 such that a fluid tight seal is formed therebetween. Accordingly, the inner surface 206, the annular seal 80, the axial collar 219 and the bottom surface 50 of the second end cap 14 cooperate to prevent unfiltered fuel 422 entering the internal chamber 306 via the inlet ports 208 from bypassing filtering through the media 16 and escaping through the central opening 202 formed in the cover plate 200. The seal 80 may be axially compressed between the second end cap 14 and the cover plate 200 when the cover plate 200 and the housing 300 are axially pressed together to secure the cover plate 200 to the housing 300 via the snap-fit connection.

In some implementations, the standpipe assembly 450 is at least partially disposed within the internal chamber 306 of the housing 300. The standpipe assembly 450 includes an elongated standpipe member 452 and a base member 456 interconnected to the standpipe member 452 and having a larger diameter than the standpipe member 452. In some configurations, the spin-on filter 100 is configured to mount onto the standpipe assembly 450 via threaded engagement between the internal threads 218 of the central opening 202 of the cover plate 200 and corresponding threads associated with the base member 456 of the standpipe assembly 450. The standpipe member 452 is centrally located within the housing 300 (e.g., coaxial with the longitudinal axis L of FIG. 1) and axially extends upward or away from the cover plate 200 at the open end 304 of the housing 300 and through the standpipe opening 58 formed through the second end cap 14. The standpipe member 452 includes a distal end terminating within a central cavity 18 of the filter element 10 that defines a fuel outlet port 430 for directing filtered fuel 432 upon passing through the filter media 16. The fuel outlet port 430 directs the filtered fuel 432 out of the housing 300 and to an engine downstream of the filter assembly 300. Accordingly, the unfiltered fuel 422 is received by the internal chamber 306 of the housing 300 through the one or more inlet ports 208 and the unfiltered fuel 422 may pass through the filter media 16 in the radial inward direction and exit as filtered fuel 432 within the central cavity 18. In some examples, a support core 17 is disposed within the central cavity 18 to provide support for the filter media 16.

The example of FIG. 4 shows the interference portions 228 of the engagement tabs 220 of the cover plate 200 engaged with the corresponding receiving slots 320 formed within the interior wall 310 of the housing 300. As the mating location between each tab-receiving slot pair 220, 320 is located within the internal chamber 306 of the housing 300, the engagement tabs 220 are not accessible from outside the filter 100, and therefore, an end user is prevented from disassembling the filter 100 once the components 200, 300 are secured/mated/joined together via the snap-fit connection. The interference portion 228 of each engagement tab 220 may include the barb 230 that rests on a stop 330 of the corresponding receiving slot 320 when the interference portion 228 snaps or locks into the corresponding receiving slot 320. Here, the barb 230 and stop 330 cooperate to prevent the cover plate 200 from moving relative to the housing 300 when pulled away from the housing 300. As illustrated in FIG. 4, in some implementations, the filter 100 includes one or more seal members 110 disposed within the receiving slots 320, such that, in the assembled configuration, the one or more seal members 110 engage the stop 330, and the barbs 230 engage the seal members 110. The cambered leading edge 232 of each engagement tab 220 may prevent the tabs 220 from getting stuck upon surfaces within the internal chamber 306 while the components 200, 300 are being axially pressed but before the interference portions 228 lock into place within the corresponding receiving slots 320. For instance, the seating surface 316 within the internal chamber 306 defined at the transition between the wide section 310w and the narrow section 310n of the interior wall 310 may have a propensity to interfere with the engagement tabs 220 as they move axially toward their corresponding receiving slots 320. Here, the cambered leading edge 232 may allow engagement tabs to smoothly guide into the corresponding axial grooves 322 formed in the interior wall 310, which exerts a radial force upon the interference portion 228 to thereby cause the axial portions 222 to deflect radially inward until the interference portions 228 lock into place within the corresponding receiving slots 330.

Figure 5:
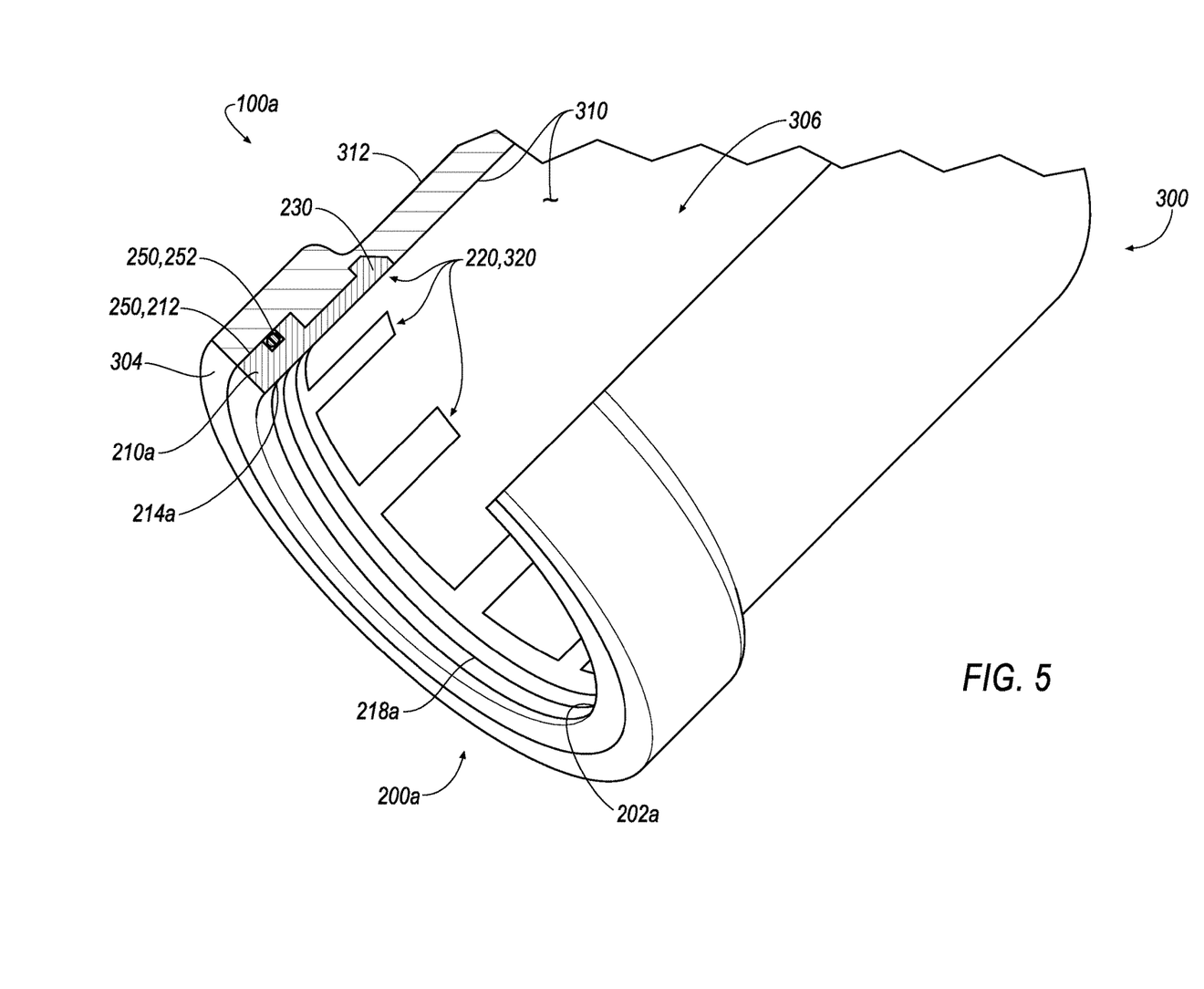
FIG. 5 is a partial perspective cutaway view of an alternate spin-on filter including a cover plate defining an enlarged central opening and secured to an open end of a canister using a snap-fit connection.

Referring to FIG. 5, in some implementations, a spin-on filter 100a includes a cover plate 200a securing to a filter housing 300 using a snap-fit connection. In view of the substantial similarity in structure and function of the components associated with the spin-on filter 100 with respect to the spin-on filter 100, like reference numerals are used hereinafter and in the drawings to identify like components while like reference numerals containing letter extensions are used to identify those components that have been modified.

The housing 300 includes the closed end 302 (as shown in FIG. 3) and the circumferential interior wall 310 axially extending from the closed end 302 to the open end 304 and circumscribing the internal chamber 306 configured to receive the filter element 10. By contrast to the cover plate 200 of FIGS. 1, 2, and 4, the cover plate 200a of FIG. 5 defines an enlarged central opening 202a circumscribed by an outer peripheral wall 210a. The outer peripheral wall 210a may define an outer surface for the plate 200a between an inner peripheral surface 214a and the outer peripheral surface 212. Here, the inner peripheral surface 214a of the outer peripheral wall 210a bounds the central opening 202a and may include threads 218a adapted to threadingly engage with corresponding threads of a standpipe member. The cover plate 200a is substantially identical to the cover plate 200 except that the central opening 202a is entirely defined by the outer peripheral wall 210a to thereby omit inlet ports for a fluid, such as fuel, for example. Instead, inlet ports may be provided by the standpipe assembly (e.g., standpipe assembly 450) upon mounting thereto.

Figure 6:
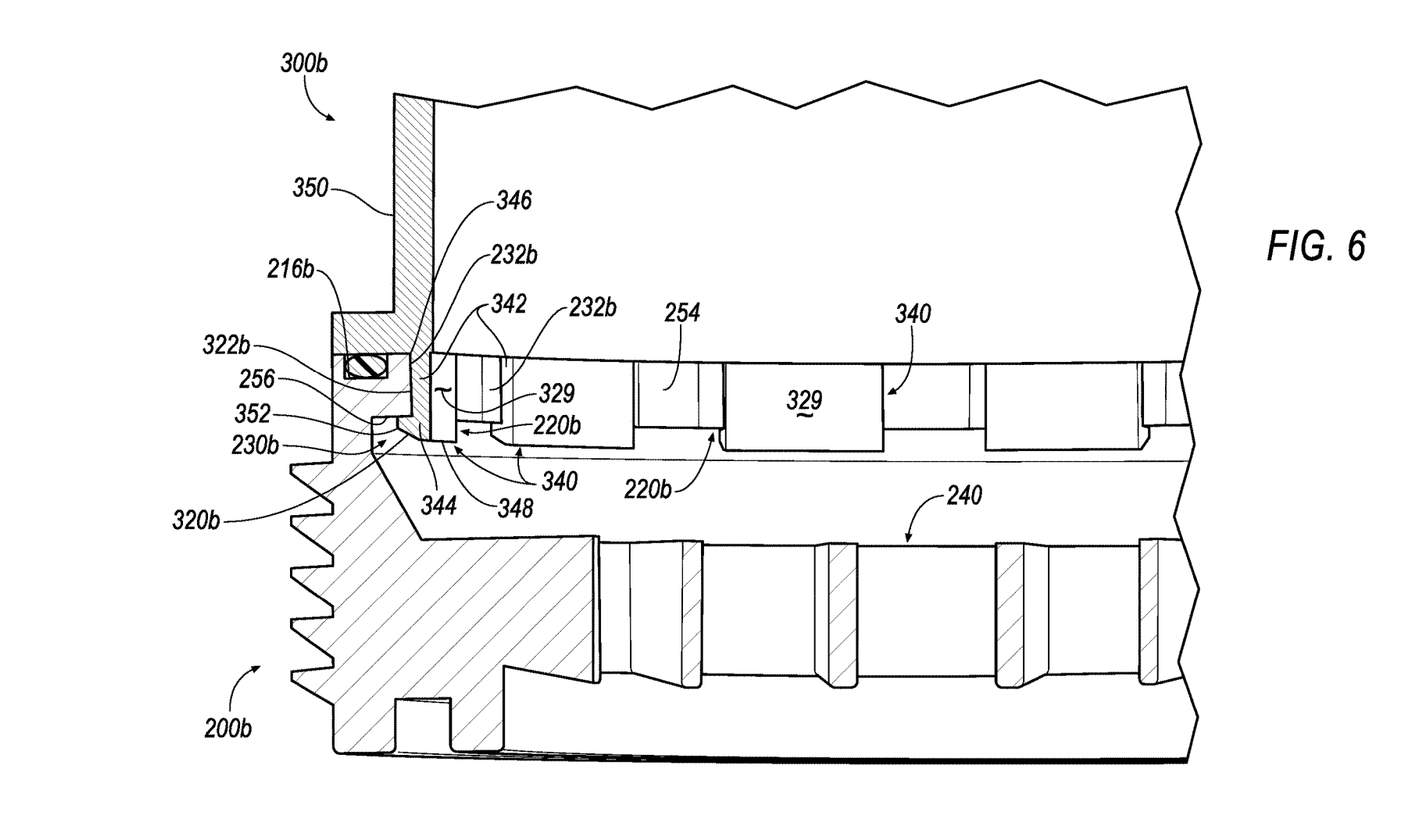
FIG. 6 is a partial perspective cutaway view of another spin-on filter including a cover plate secured to an open end of a housing using a snap-fit connection.

The spin-on filter 100, 100a shows a configuration with the engagement tabs 220 axially protruding from the cover plate 200, 200a and the receiving slots 320 formed in the interior wall 310 of the housing 300 to provide the mating location within the internal chamber 306 that secures the cover plate 200, 200a to the housing 300 when axially pressed together. With reference to FIG. 6, in other configurations, the engagement tabs 220 may protrude axially and/or radially from the interior wall 310 of the housing 300 in a direction toward the open end 304. The receiving slots 320 may be formed within the inner peripheral surface 214, 214a of the outer peripheral wall 210, 210a without limitation. In this configuration, the mating location is also provided within the internal chamber 306 for securing the cover plate 200, 200a to the housing 300 when axially pressed together.

With reference to FIG. 6, another spin-on filter 100b is shown. The structure and function of the spin-on filter 100b may be substantially similar to that of the spin-on filter 100, 100a, apart from any exceptions described below and/or shown in the Figures. Accordingly, the structure and/or function of similar features will not be described again in detail. In addition, like reference numerals are used hereinafter and in the drawings to identify like features, while like reference numerals containing letter extensions (i.e., "b") are used to identify those features that have been modified.

The spin-on filter 100b may include a cover plate 200b secured to a filter housing 300b using a snap-fit connection. In this regard, a series of engagement features 340 of the housing 300b and corresponding series of engagement features 220b formed in the cover plate 200b may provide the snap-fit connection to secure the cover plate 200b to the housing 300b. The mating between each pair of engagement features 220b, 340b may occur when the cover plate 200b and the housing 300b are axially pressed together to prevent the plate 200b from moving relative to the housing 300b after mating occurs. For example, as illustrated in FIG. 6, each engagement feature 340 may axially extend into an internal chamber 240 of the cover plate 200b and mate with the corresponding engagement feature 220b at a corresponding mating location within the internal chamber 240 of the cover plate 200b. In some implementations, once the engagement features 220b mate or engage with the engagement features 340, the cover plate 200b is permanently secured/fixed to the housing 300b such that the engagement features 340 cannot be disengaged from the corresponding engagement features 220b.

Figure 8:
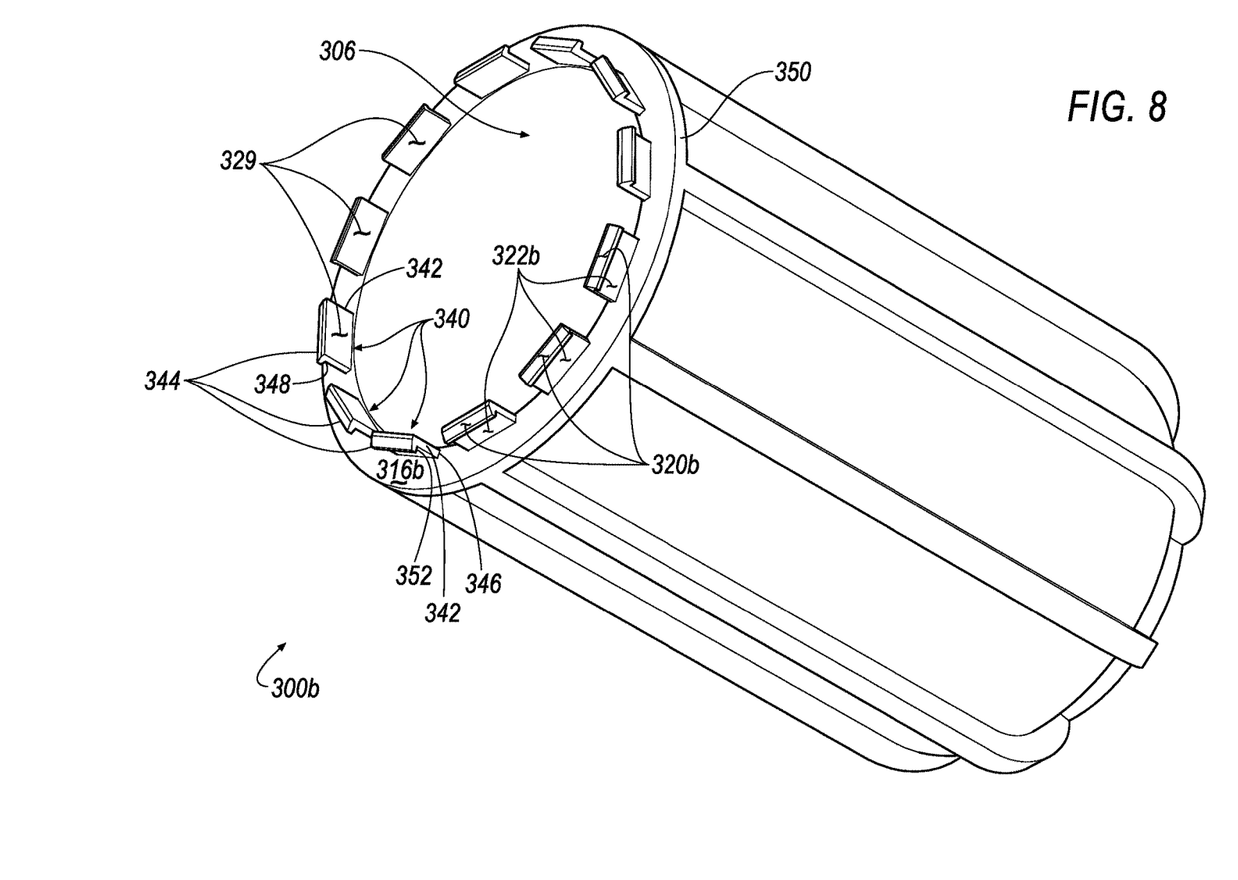
FIG. 8 is a bottom perspective view of the canister of FIG. 6 showing a series of engagement tabs that protrude axially away from the canister.

As illustrated in FIG. 8, each engagement feature 340 may define a tab having an axial portion 342 and an interference portion 344. In some implementations, the engagement features 340 are uniformly spaced about the housing 300b. The axial portion 342 may axially extend from a proximal end 346 to a distal end 348 and may be disposed radially inward from an outer peripheral wall 350 of the filter housing 300b. The axial portion 342 may include a radially outer surface 322b and a radially inner surface 329. In some implementations, the radially outer surface 322b and/or the radially inner surface 329 defines a substantially planar construct.

The interference portion 344 protrudes radially away (e.g., radially outward) from the distal end 348 of the axial portion 342 and is configured to provide the mating with the corresponding engagement feature 220b to prevent the cover plate 200b and the housing 300b from moving relative to one another when the plate 200b and housing 300b are axially pressed together. In this regard, the interference portion 344 of each engagement feature 340 may include a radially-extending barb 352 having a cambered leading edge 320b.

Figure 7:
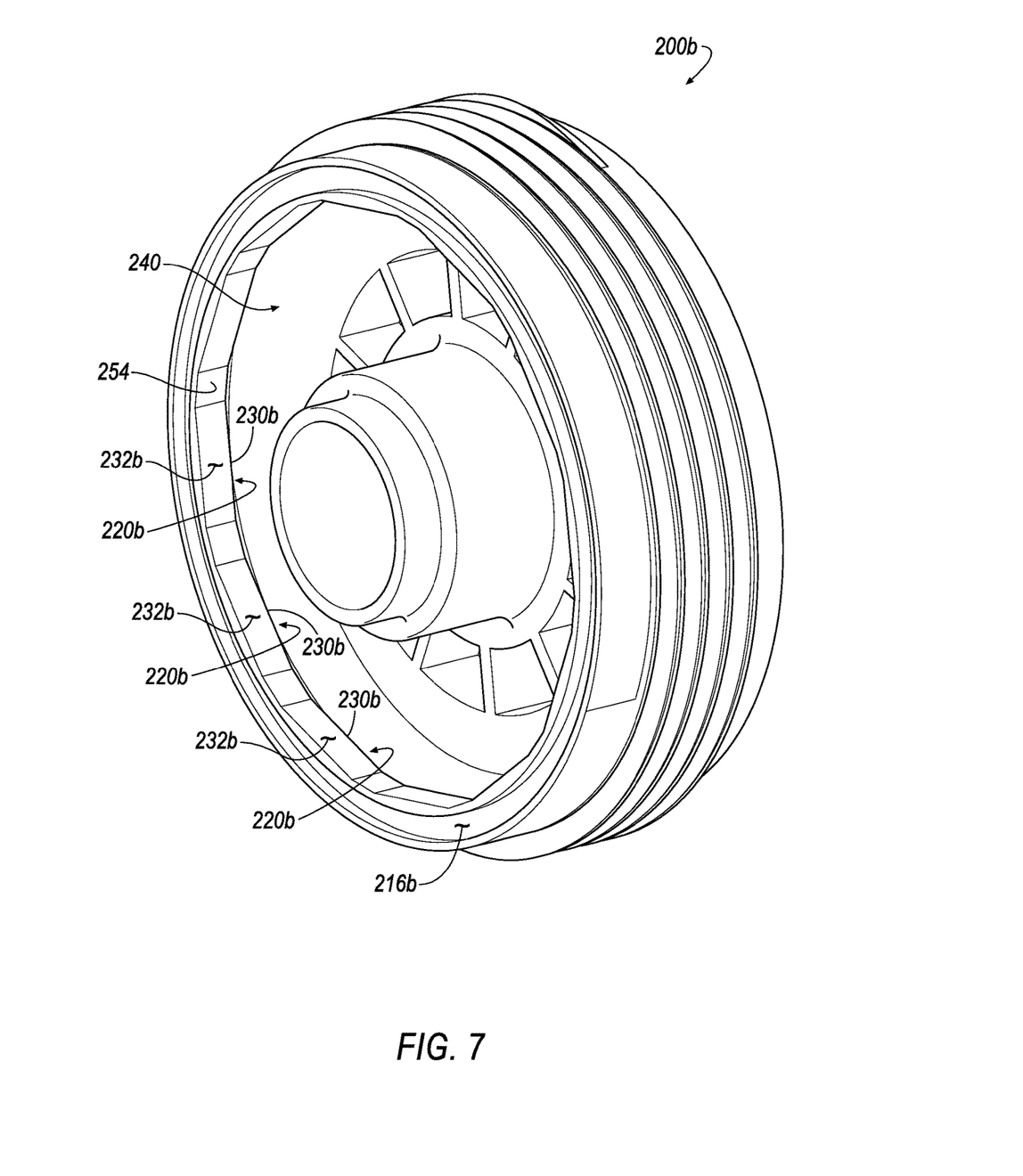
FIG. 7 is a top perspective view of the cover plate of FIG. 6 showing a series of receiving slots formed therein.

As illustrated in FIG. 7, the engagement features 220b of the cover plate 200b may be formed within an interior wall 254 of the cover plate 200b. In some implementations, the engagement features 220b are uniformly spaced about the interior wall 254. Each engagement feature 220b may define a recess formed in the interior wall 254. Each engagement feature 220b may be associated with a corresponding axial wall 232b having a smaller radial depth into the interior wall 254 than a corresponding receiving slot 230b defined in part by a radially extending stop surface 256 of the engagement feature 220b. In this regard, the receiving slot 230b may define a cavity having a geometry that corresponds with the geometry of the interference portions 344 (e.g., the barb 352) of the engagement features 340. In some implementations, the receiving slot 230b may define an annular cavity defined radially outward from the interior wall 254 and/or the axial wall 232b.

The axial wall 232b may be configured to axially guide the interference portion 344 of the corresponding engagement feature 340 into mating engagement with the associated receiving slot 230b when the cover plate 200b and the housing 300b are axially pressed together. In some examples, the axial walls 232b define a substantially planar construct having an axial length substantially equal to an axial length of the radially outer surface 322b of the engagement features 340.

As illustrated in FIG. 6, the interference portion 344 of the engagement feature 340 of the housing 300b engage with the corresponding engagement feature 220b (e.g., recess) formed in the cover plate 200b. The barb 352 of each engagement feature 340 may rest on the stop surface 256 of the corresponding engagement features 220b when the interference portion 344 snaps or locks into the corresponding receiving slot 230b. Here, the barb 352 and stop surface 256 cooperate to prevent the cover plate 200b from moving relative to the housing 300b when pulled away from the housing 300b.

A number of implementations have been described. Nevertheless, it will be understood that various modifications may be made without departing from the spirit and scope of the disclosure. Accordingly, other implementations are within the scope of the following claims. compressible

What is claimed is:

1. A spin-on filter comprising:
   a housing having a closed end and a circumferential interior wall axially extending from the closed end to an open end and circumscribing an internal chamber configured to receive a filter element;
   a cover plate defining a central opening, the cover plate including a substantially planar outer surface extending radially outward from the central opening to an outer circumferential wall; and
   a series of engagement tabs integrally formed with one of the outer circumferential wall of the cover plate or the interior wall of the housing, each engagement tab configured to mate with a corresponding one of a series of receiving slots formed within the other one of the outer circumferential wall of the cover plate or the interior wall of the housing when the cover plate and the housing are axially pressed together to secure the cover plate to the open end of the housing,
   wherein each engagement tab comprises:
      an axial portion extending axially from a proximal end to a distal end, the axial portion disposed radially inward from an outer peripheral edge of the outer circumferential wall of the cover plate; and
      an interference portion protruding radially away from the distal end of the axial portion, the interference portion configured to mate with the corresponding receiving slot to prevent the cover plate and the housing from moving relative to one another when the cover plate and the housing are axially pressed together.

2. The spin-on filter of claim 1, wherein the interior wall at the open end of the housing comprises a greater diameter than an outer circumferential edge of the outer circumferential wall, the interior wall at the open end of the housing enclosing at least a portion of the outer circumferential wall of the cover plate when the cover plate is secured to the open end of the housing.

3. The spin-on filter of claim 1, wherein each engagement tab mates with the corresponding receiving slot at a corresponding mating location within the internal chamber of the housing, the mating location obstructed from view by the outer surface of the cover plate and an exterior wall of the housing, the exterior wall disposed on an opposite side of the housing than the interior wall.

4. The spin-on filter of claim 1, wherein each receiving slot is associated with a corresponding axial groove having a smaller radial depth than the receiving slot, the axial groove configured to axially guide the interference portion of the corresponding engagement tab into mating engagement with the receiving slot when the cover plate and the housing are axially pressed together.

5. The spin-on filter of claim 4, wherein the axial portion of each engagement tab is configured to flex radially away from the corresponding receiving slot while the interference portion axially guides along the corresponding axial groove.

6. The spin-on filter of claim 1, wherein the proximal end of the axial portion is integrally formed with the outer circumferential wall of the cover plate, the distal end of the axial portion is disposed further from the outer surface of the cover plate than the proximal end, and the interference portion protrudes radially outward from the distal end of the axial portion and toward the corresponding receiving slot formed within the interior wall of the housing.

7. The spin-on filter of claim 1, wherein the proximal end of the axial portion is integrally formed with the interior wall of the cover plate, the distal end of the axial portion is disposed closer to the outer surface of the cover plate than the proximal end, and the interference portion protrudes radially outward from the distal end of the axial portion toward the corresponding receiving slot formed within an inner peripheral edge of the outer circumferential wall of the cover plate.

8. The spin-on filter of claim 1, wherein the interior wall of the housing comprises:
   a wide section proximate to the open end of the housing and enclosing at least a portion of the outer circumferential wall of the cover plate when the cover plate is secured to the open end of the housing; and
   a narrow section axially extending between the wide section and the closed end of the housing, the narrow section comprising a smaller diameter than the wide section and axially spaced apart from the open end of the housing by an axial distance of the wide section.

9. The spin-on filter of claim 8, wherein the series of receiving slots are formed in the narrow section of the interior wall, each receiving slot associated with a corresponding axial groove formed in the narrow section of the interior wall and axially extending from the wide section to the corresponding receiving slot, each axial groove disposed radially inward from the wide section of the interior wall.

10. A spin-on filter comprising:
   a housing having a closed end and a circumferential interior wall axially extending from the closed end to an open end and circumscribing an internal chamber configured to receive a filter element; and
   a cover plate including an outer circumferential wall surrounding a central opening, the cover plate having a series of engagement tabs configured to axially extend into the internal chamber of the housing and mate with corresponding ones of a series of receiving slots formed within the interior wall of the housing when the cover plate and the housing are axially pressed together to secure the cover plate to the open end of the housing, wherein each engagement tab comprises:
      an axial portion axially extending from a proximal end integrally formed with the outer circumferential wall or an inner surface of the cover plate to a distal end, the inner surface of the cover plate radially extending between the central opening and an inner peripheral edge of the outer circumferential wall; and
      an interference portion extending radially outward from the distal end of the axial portion,
   wherein the interior wall of the housing comprises:
      a wide section proximate to the open end of the housing and enclosing at least a portion of the outer circumferential wall of the cover plate when the cover plate is secured to the open end of the housing; and
      a narrow section axially extending between the wide section and the closed end of the housing, the narrow section comprising a smaller diameter than the wide section and axially spaced apart from the open end of the housing by an axial distance of the wide section, and
   wherein the series of receiving slots are formed within the narrow section of the interior wall, each receiving slot configured to receive the interference portion of the corresponding engagement tab to prevent the cover plate and the housing from moving relative to one another when the cover plate and the housing are axially pressed together.

11. The spin-on filter of claim 10, wherein each receiving slot is associated with a corresponding axial groove formed in the narrow section of the interior wall, the axial groove axially extending from the wide section to the corresponding receiving slot, each axial groove disposed radially inward from the wide section of the interior wall and defining an axial length substantially equal to an axial length of the axial portion of the corresponding engagement tab.

12. The spin-on filter of claim 10, wherein the inner peripheral edge of the outer circumferential wall defines a diameter substantially equal to a diameter of the narrow section of the interior wall.

13. The spin-on filter of claim 10, wherein the central opening comprises internal threads adapted to threadingly engage with corresponding threads of a standpipe assembly.

14. The spin-on filter of claim 10, wherein the cover plate further comprises:
   a substantially planar outer surface radially extending between the central opening and an outer peripheral edge of the outer circumferential wall,
   wherein the inner surface is substantially planar and disposed on an opposite side of the cover plate than the outer surface and opposing the internal chamber when the cover plate is secured to the housing, the inner surface radially extending between the central opening and the inner peripheral edge of the outer circumferential wall; and
   one or more inlet ports formed through the inner and outer surfaces of the cover plate.

15. The spin-on filter of claim 14, wherein the cover plate further comprises an axial collar circumscribing the central opening an extending axially away from at least the inner surface.

16. The spin-on filter of claim 10, wherein the inner peripheral edge of the outer circumferential wall circumscribes the central opening.

17. A method of manufacturing a spin-on filter, the method comprising:
   inserting a filter element into an internal chamber of a housing, the housing including a closed end and a circumferential interior wall axially extending from the closed end to an open end and circumscribing the internal chamber;
   positioning a cover plate in alignment with the open end of the housing, the cover plate having a series engagement tabs configured to extend into the internal chamber of the housing when the cover plate is aligned with the open end of the housing; and
   axially pressing the cover plate and the housing together to cause each engagement tab to mate with a corresponding one of a series of receiving slots formed within the interior wall of the housing, the mating between the engagement tabs and the receiving slots securing the cover plate to the open end of the housing,
   wherein a radial seal is disposed between an outer circumferential edge of the cover plate and the interior wall of the housing to provide a fluid tight seal between the outer circumferential edge of the cover plate and the interior wall of the housing when the cover plate secures to the open end of the housing.

18. A spin-on filter comprising:
   a housing having a closed end and a circumferential interior wall axially extending from the closed end to an open end and circumscribing an internal chamber configured to receive a filter element;
   a cover plate defining a central opening, the cover plate including a substantially planar outer surface extending radially outward from the central opening to an outer circumferential wall; and
   a series of engagement tabs integrally formed with the outer circumferential wall of the cover plate, each engagement tab configured to mate with a corresponding one of a series of receiving slots formed within the interior wall of the housing when the cover plate and the housing are axially pressed together to secure the cover plate to the open end of the housing,
   wherein the interior wall of the housing comprises:
      a wide section proximate to the open end of the housing and enclosing at least a portion of the outer circumferential wall of the cover plate when the cover plate is secured to the open end of the housing; and
      a narrow section axially extending between the wide section and the closed end of the housing, the narrow section comprising a smaller diameter than the wide section and axially spaced apart from the open end of the housing by an axial distance of the wide section, and wherein the series of receiving slots are formed in the narrow section of the interior wall, each receiving slot associated with a corresponding axial groove formed in the narrow section of the interior wall and axially extending from the wide section to the corresponding receiving slot, each axial groove disposed radially inward from the wide section of the interior wall.

19. A spin-on filter comprising:
a housing having a closed end and a circumferential interior wall axially extending from the closed end to an open end and circumscribing an internal chamber configured to receive a filter element; and
a cover plate including an outer circumferential wall surrounding a central opening, the cover plate having a series of engagement tabs configured to axially extend into the internal chamber of the housing and mate with corresponding ones of a series of receiving slots formed within the interior wall of the housing when the cover plate and the housing are axially pressed together to secure the cover plate to the open end of the housing, wherein the cover plate further comprises:
   a substantially planar outer surface radially extending between the central opening and an outer peripheral edge of the outer circumferential wall;
   a substantially planar inner surface disposed on an opposite side of the cover plate than the outer surface and opposing the internal chamber when the cover plate is secured to the housing, the inner surface radially extending between the central opening and an inner peripheral edge of the outer peripheral wall; and
   one or more inlet ports formed through the inner and outer surfaces of the cover plate.

* * * * *